(12) United States Patent
Ohrbom et al.

(10) Patent No.: US 6,391,968 B1
(45) Date of Patent: May 21, 2002

(54) CURABLE COATING COMPOSITIONS CONTAINING CARBAMATE FUNCTIONAL POLYMERS AND CARBAMATE FUNCTIONAL REACTIVE ADDITIVES

(75) Inventors: Walter H Ohrbom, Hartland Township; Paul J. Harris, West Bloomfield, both of MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/464,308

(22) Filed: Dec. 15, 1999

(51) Int. Cl.$^7$ .................... C09D 201/02; C08G 18/38
(52) U.S. Cl. ............... 525/162; 525/330.5; 525/375; 525/452; 525/509; 525/374
(58) Field of Search ................... 525/452, 509, 525/330.5, 375, 162, 374

(56) References Cited

U.S. PATENT DOCUMENTS

| | | |
|---|---|---|
| 2,979,514 A | 4/1961 | O'Brien et al. .......... 260/340.2 |
| 3,479,328 A | 11/1969 | Nordstrom ................. 260/86.1 |
| 3,674,838 A | 7/1972 | Nordstrom ................... 260/482 |
| 4,126,747 A | 11/1978 | Cowherd, III et al. |
| 4,279,833 A | 7/1981 | Culbertson et al. |
| 4,340,497 A | 7/1982 | Knopf |
| 4,520,167 A | 5/1985 | Blank et al. ................. 525/131 |
| 4,814,382 A | 3/1989 | Hoy et al. |
| 4,977,231 A | 12/1990 | McVay et al. |
| 5,158,808 A | 10/1992 | Hoy et al. |
| 5,336,566 A | 8/1994 | Rehfuss |
| 5,512,639 A | 4/1996 | Rehfuss et al. |
| 5,552,497 A | 9/1996 | Taylor et al. |
| 5,593,733 A | 1/1997 | Mayo |
| 5,646,214 A | 7/1997 | Mayo |
| 5,714,549 A | 2/1998 | Wu et al. |
| 5,719,237 A | 2/1998 | Rehfuss et al. |
| 5,726,254 A | 3/1998 | Wu et al. |
| 5,744,550 A | 4/1998 | Menovcik et al. |
| 5,866,259 A | 2/1999 | Harris et al. ............. 428/424.4 |
| 5,872,195 A | 2/1999 | Green et al. ................. 525/481 |
| 6,165,618 A | * 12/2000 | Ohrbom et al. .......... 428/423.1 |

FOREIGN PATENT DOCUMENTS

| | | | |
|---|---|---|---|
| CA | 1295767 | 2/1992 | ............ C09D/7/12 |
| EP | WO 87/00851 | 2/1987 | ............ C09D/7/12 |
| EP | WO 88/02766 | 4/1988 | ............ C09D/7/00 |
| EP | 0 680 988 A | 11/1995 | ............ C08G/71/00 |
| EP | 0767 226 A | 4/1997 | ......... C09D/201/00 |
| EP | 0 780 455 A | 6/1997 | ......... C09D/201/06 |
| EP | 198 24 656 A1 | 12/1998 | ......... C07C/271/18 |
| EP | 0 889 101 A2 | 1/1999 | ............ C09D/5/44 |
| EP | WO 99/33915 | 8/1999 | ............ C08L/33/14 |
| EP | WO 00 37572 A | 6/2000 | ............ C09D/5/44 |
| EP | WO 00 37573 A | 6/2000 | ............ C09D/5/44 |

OTHER PUBLICATIONS

Huls American Inc., Entitled "Coatings Raw Material" Product Information, Vestanat T 1890/100, 04.01.92, 1 page.
International Search Report for PCT/US 00/28034.
U.S. Patent Application Ser. No. 08/333,804 Filed Nov. 3, 1994, Walter Ohrbom, Curable coating compositions containing carbamte resin.
International Search Report for PCT/US 00/27598.
International Search Report for PCT/US 00/28047.
International Search Report for PCT/US 00/27128.

* cited by examiner

*Primary Examiner*—D. R. Wilson
(74) *Attorney, Agent, or Firm*—Mary E. Golota

(57) ABSTRACT

The invention thus provides a curable coating composition comprising (A) a polymer resin comprising at least one primary carbamate group, (B) a curing agent having groups that are reactive with said functional groups on (A), and (C) a reactive additive comprising at least one compound having a molecular weight of from 131 to 2000 and comprising at least one primary carbamate group and at least one alkyl group selected from the group consisting of straight chain alkyl groups of more than 10 carbons, branched alkyl groups of from 5 to 30 carbons, and mixtures thereof, wherein one or both of (A) and (B) comprise groups that are reactive with the primary carbamate group of (C). The invention also provides a method of making a preferred embodiment of the reactive additive (C) and the reactive additive (C).

9 Claims, No Drawings

CURABLE COATING COMPOSITIONS CONTAINING CARBAMATE FUNCTIONAL POLYMERS AND CARBAMATE FUNCTIONAL REACTIVE ADDITIVES

FIELD OF THE INVENTION

The instant invention relates to coating compositions comprising carbamate functional polymers and reactive additives. In particular, the invention provides coating compositions comprising a reactive additive comprising at least one compound having a molecular weight of from 131 to 2000 and at least one primary carbamate group and at least one alkyl group selected from the group consisting of straight chain alkyl groups of more than 10 carbons, branched alkyl group of from 5 to 30 carbons, and mixtures thereof.

BACKGROUND OF THE INVENTION

Curable coating compositions such as thermoset coatings are widely used in the coatings art. They are often used for topcoats in the automotive and industrial coatings industry. Color-plus-clear composite coatings are particularly useful as topcoats where exceptional gloss, depth of color, distinctness of image, or special metallic effects is desired. The automotive industry has made extensive use of these coatings for automotive body panels. Color-plus-clear composite coatings, however, require an extremely high degree of clarity in the clearcoat to achieve the desired visual effect. High-gloss coatings also require a low degree of visual aberrations at the surface of the coating in order to achieve the desired visual effect such as high distinctness of image (DOI).

As such, these coatings are especially susceptible to a phenomenon known as environmental etch. Environmental etch manifests itself as spots or marks on or in the finish of the coating that often cannot be rubbed out.

It is often difficult to predict the degree of resistance to environmental etch that a high gloss or color-plus-clear composite coating will exhibit. Many coating compositions known for their durability and/or weatherability when used in exterior paints, such as high-solids enamels, do not provide the desired level of resistance to environmental etch when used in high gloss coatings such as the clearcoat of a color-plus-clear composite coating.

Many compositions have been proposed for use as the clearcoat of a color-plus-clear composite coating, such as polyurethanes, acid-epoxy systems and the like. However, many prior art systems suffer from disadvantages such as coatability problems, compatibility problems with the pigmented basecoat, solubility problems. Moreover, very few one-pack coating compositions have been found that provide satisfactory resistance to environmental etch, especially in the demanding environment of automotive coatings.

There is also a continuing desire to reduce the volatile organic content (VOC) of coating compositions. This must be done without sacrificing the Theological properties of the coating composition required for trouble-free application of the composition while maintaining the desired level of appearance. In addition, it is desirable to provide coatings with a good combination of properties such as durability, hardness, flexibility, and resistance to scratching, marring, solvents, and acids.

Curable coating compositions utilizing carbamate-functional resins are described in U.S. Pat. No. 5,356,669. These coating compositions can provide significant etch advantages over other coating compositions, such as hydroxy-functional acrylic/melamine coating compositions. It may often be desirable, however, to provide still further improvements in the above described coating properties.

U.S. Pat. No. 4,814,382, 5,114,015, and 5,158,808 describe the use of certain N-alkyl carbamate compounds as reactive diluents in coating compositions having OH-functional curable polymer resins. These compounds, however, may require excessively high catalyst or temperature levels in order to fully react into the crosslink matrix during cure of the film.

WO 87/00851 describes the use of certain reactive carbamate derivatives in an effort to minimize the emission of volatile organic compounds (VOC). U.S. Pat. No. 5,744,550 describes the use of primary carbamate additives. However, further reductions in VOC are desirable without loss of desirable performance properties such as etch resistance and the like.

SUMMARY OF THE INVENTION

It has been surprisingly discovered that certain primary carbamate reactive additives provide advantages over the prior art. In particular, it has been found that the incorporation of a particular reactive additive provides improved sprayability at a given nonvolatile level and advantageous resistance to environmental etch, even with respect to compositions containing carbamate functional polymers. The reactive additive comprises at least one compound having a molecular weight of from 131 to 2000 and comprising at least one primary carbamate group and at least one alkyl group selected from the group consisting of straight chain alkyl groups of more than 10 carbons, branched alkyl groups of from 5 to 30 carbons, and mixtures thereof.

The invention thus provides a curable coating composition comprising (A) a polymer resin comprising at least one primary carbamate group, (B) a curing agent having groups that are reactive with said carbamate groups on (A), and (C) a reactive additive comprising at least one compound having a molecular weight of from 131 to 2000 and comprising at least one primary carbamate group and at least one alkyl group selected from the group consisting of straight chain alkyl groups of more than 10 carbons, branched alkyl groups of from 5 to 30 carbons, and mixtures thereof, wherein one or both of (A) and (B) comprise groups that are reactive with the primary carbamate group of (C).

DESCRIPTION OF THE PREFERRED EMBODIMENTS

The polymer component (A) used in the composition of the invention can be prepared in a variety of ways. One way to prepare such polymers is to prepare an acrylic monomer having carbamate functionality in the ester portion of the monomer. Such monomers are well known in the art and are described, for example in U.S. Pat. No. 3,479,328, 3,674,838, 4,126,747, 4,279,833, and 4,340,497, 5,356,669, and WO 94/10211, the disclosures of which are incorporated herein by reference. One method of synthesis involves reaction of a hydroxy ester with urea to form the carbamyloxy carboxylate (i.e., carbamate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically unsaturated monomers, if desired, by techniques well known in the art.

An alternative route for preparing the polymer (A) used in the composition of the invention is to react an already-formed polymer such as an acrylic polymer with another component to form a carbamate-functional group appended to the polymer backbone, as described in U.S. Pat. No. 4,758,632, the disclosure of which is incorporated herein by reference. One technique for preparing polymers useful as component (A) involves thermally decomposing urea (to give off ammonia and HNCO) in the presence of a hydroxy-functional acrylic polymer to form a carbamate-functional acrylic polymer. Another technique involves reacting the hydroxyl group of a hydroxyalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well known in the art and include unsaturated m-tetramethyl xylene isocyanate (sold by American Cyanamid as TMI®). Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. Another technique is to transcarbamylate a hydroxy-functional acrylic polymer with an alkyl carbamate. A more difficult, but feasible way of preparing the polymer would be to trans-esterify an acrylate polymer with a hydroxyalkyl carbamate.

The polymer (A) will generally have a molecular weight of 2000–20,000, and preferably from 3000–6000. As used herein, molecular weight means number average molecular weight, and can be determined by the GPC method using a polystyrene standard. The carbamate content of the polymer, on a molecular weight per equivalent of carbamate functionality, will generally be between 200 and 1500, and preferably between 300 and 500. The glass transition temperature, $T_g$, of components (A) and (B) can be adjusted to achieve a cured coating having the $T_g$ for the particular application involved.

The polymer component (A) can be represented by the randomly repeating units according to the following formula:

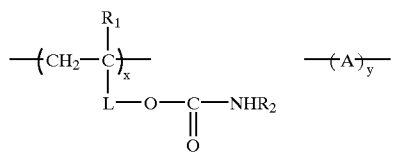

In the above formula, $R_1$ represents H or $CH_3$. $R2$ represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to hydrolysis, and should be avoided in locations that would place the ether linkage in the crosslink matrix. The values x and y represent weight percentages, with x being 10 to 90% and preferably 40 to 60%, and y being 90 to 10% and preferably 60 to 40%.

In the formula, A represents repeat units derived from one or more ethylenically unsaturated monomers. Such monomers for copolymerization with acrylic monomers are known in the art. They include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), styrene, vinyl toluene and the like.

L represents a divalent linking group, preferably an aliphatic of 1 to 8 carbon atoms, cycloaliphatic, or aromatic linking group of 6 to 10 carbon atoms. Examples of L include

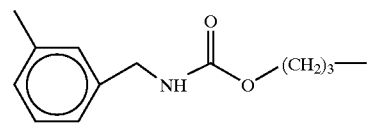

—$(CH_2)$—, —$(CH_2)_2$—, —$(CH_2)_4$—, and the like. In one preferred embodiment, —L— is represented by —COO—L'— where L' is a divalent linking group. Thus, in a preferred embodiment of the invention, the polymer component (a) is represented by randomly repeating units according to the following formula:

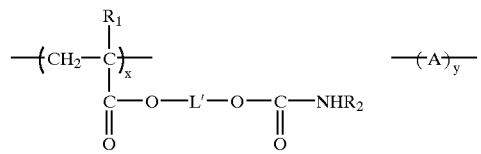

In this formula, $R_1$, $R_2$, A, x, and y are as defined above. L' may be a divalent aliphatic linking group, preferably of 1 to 8 carbon atoms, e.g., —$(CH_2)$—, —$(CH_2)_2$—, —$(CH_2)_4$—, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an —NHCOO— urethane linkage as a residue of the isocyanate group.

Alternatively, as indicated in the Example below, a suitable polymer resin is the reaction product of the isocyanurate of IPDI (isophorone diisocyante) and a beta-hydroxy alkyl carbamate such as beta-hydroxybutyl carbamate.

The composition of the invention is cured by a reaction of the carbamate-functional polymer component (A) with a component (B) that Is a compound having a plurality of functional groups that are reactive with the carbamate groups on component (A). Such reactive groups include active methylol or methylalkoxy groups on aminoplast crosslinking agents or on other compounds such as phenoy-formaldehyde adducts, siloxane groups, and anhydride groups. Examples of (B) compounds include melamine formaldehyde resin (including monomeric or polymeric melamine resin and partially or fully alkylated melamine resin), blocked or unblocked polyisocyanates (e.g., TDI, MDI, isophorone diisocyanate, hexamethylene diisocyanate, and isocyanurate trimers of these, which may be blocked for example with alcohols or oximes), urea resins (e.g., methylol ureas such as urea formaldehyde resin, alkoxy ureas such as butylated urea formaldehyde resin), polyanhydrides (e.g., polysuccinic anhydride), and polysiloxanes (e.g., trimethoxy siloxane). Aminoplast resin such as melamine formaldehyde resin or urea formaldehyde resin are especially preferred.

Compounds suitable for use as reactive additive (C) are those having at least one primary carbamate group and at least one alkyl radical selected from the group consisting of straight chain alkyl groups of more than 10 carbons, branched alkyl groups of from 5 to 30 carbons, and mixtures thereof.

As used herein, "primary carbamate group" refers to the functional group having the structure

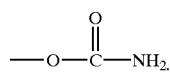

Thus, the primary carbamate group of the invention may be defined as a terminal or pendent carbamate group. Although compounds suitable for use as reactive additive (C) may comprise more than one primary carbamate group, it is most preferred that such compounds have one primary carbamate group.

In addition to the at least one primary carbamate group, compounds suitable for use as reactive additive (C) will further comprise at least one alkyl group selected from the group consisting of branched alkyl groups having from 5 to 30 total carbons, straight chain alkyl groups of more than 10 carbons, and mixtures thereof.

As used herein, the term "branched" refers to both lateral branches and forked branches. Lateral refers to a branch of two small chains at the end atom of a carbon chain. Forked refers to a branch of two small chains in the middle of a carbon chain. For the purposes of the instant invention a carbon chain may be from 1 to 15 carbons, more preferably from 1 to 8 and most preferably from 1 to 3. The total number of carbon atoms in the branched alkyl group is obtained by adding the total number of carbons in the main carbon chain+the number of carbons in all alkyl chains extending from the main carbon chain.

It will be appreciated that the main carbon chain may be from 1 to 25 carbons, preferably from 1 to 10, most preferably from 1 to 4. Most preferably, the main chain will be an aliphatic carbon chain free of unsaturation. Although the at least one branched alkyl group may comprise from 5 to 30 total carbons, more preferably, it will have from 5 to 15 carbons and most preferably from 8 to 12 carbons.

Finally, it will be appreciated that suitable "at least one alkyl groups" for use in reactive additive (C) will be substantially free of functional groups that are reactive with one or more of components (A) and (B). Thus, the at least one alkyl group selected from the group consisting of branched alkyl groups having from 5 to 30 total carbons, straight chain alkyl groups of more than 10 carbons, and mixtures thereof, will be free of hydroxyl groups and the like.

An example of an especially suitable at least one branched alkyl group is

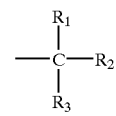

wherein $R_1$, $R_2$, and $R_3$ are alkyl groups of from 1 to 10 carbons each, preferably aliphatic groups of from 1 to 10 carbons. Most preferably, $R_1$, $R_2$, and $R_3$ will total from 8 to 12 carbons with at least one of $R_1$, $R_2$, and $R_3$ being a methyl group.

In another suitable branched alkyl group of the above same structure, one of $R_1$, $R_2$, and $R_3$, may be hydrogen, with the other two substituent groups being alkyl groups of from 1–10 carbons, preferably aliphatic groups of from 1 to 10. An example of such a group is

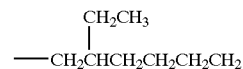

In this instance, the above structure is understood to be an example of lateral branching.

In a particularly preferred embodiment, the at least one branched alkyl group will comprise

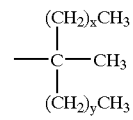

wherein x+y=5.

Alternatively, the compound suitable for use as reactive additive (C) may include a straight chain alkyl group of more than 10 carbons, preferably more than 15 carbons and most preferably more than 18. Examples of suitable straight chain, aliphatic alkyl groups include 1-eicosanyl, 1-octadecyl, 1-arachidyl, 1-dodecyl, 1-decyl, and 1-octyl, and the like.

It is most preferred that compounds suitable for use as reactive additive (C) include at least one group which is a branched alkyl group such as described above.

Compounds suitable for use as reactive additive (C) may further include heteratoms such as O and N, most preferably O. Such heteratoms may be incorporated in the form of groups such as esters, hydroxyls, ether, carboxyls, mixtures thereof and the like. Preferred are esters, hydroxyls, and mixtures thereof. Most preferably, a compound will comprise at least one hydroxyl group and one ester group in addition to the carbamate functional group and the at least one alkyl group.

Particularly suitable compounds for use as reactive additive (C) are those having the formula:

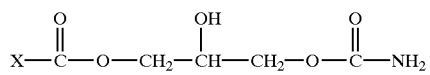

wherein X is a branched alkyl radical of from 5 to 30 total carbons, more preferably from 5 to 15 total carbons and most preferably from 8 to 12 total carbons.

A more preferred compound for use as reactive additive (C) is that having the formula:

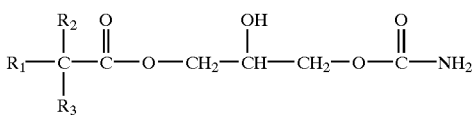

wherein $R_1$, $R_2$, and R3 are each alkyl groups of from 1 to 10 carbons, especially compounds wherein $R_1$, $R_2$, and $R_3$ total from 8 to 12 carbons with at least one of $R_1$, $R_2$, and R3 being a methyl group.

The most preferred compound for use as reactive additive (C) is that having the formula:

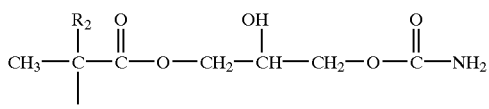

wherein $R_2$ and $R_3$ are respectively $-(CH_2)_xCH_3$ and $-(CH_2)_yCH_3$ wherein x+y=5.

The invention further provides a method of making the reactive additive of the invention. It has been discovered that the most preferred reactive additive of the invention can be made by providing a compound having at least one epoxy group and at least one alkyl group selected from the group consisting of branched alkyl groups of from 5 to 30 total carbons, straight chain alkyl groups of more than 10 carbons, and mixtures thereof. It is preferred that the compound provided will comprise at lest one branched alkyl group of from 5 to 30 total carbons. More preferably the epoxy functional compound will have one epoxy group and a branched alkyl group of from 5 to 15 total carbons and most preferably from 8 to 12 total carbons.

Examples of preferred epoxy functional/branched alkyl group containing compounds are glycidyl ethers, glycidyl esters, and epoxies based on alpha olefins, 2-ethyl hexyl glycidyl ether, and glycidyl esters of the formula:

wherein X is a branched alkyl hydrocarbon radical containing from about 5 to 30 total carbons. More preferably, X is a tertiary aliphatic group of from about 5 to 15 carbons and most preferably from 8 to 12 carbons, such as neopentanoate, neoheptanoate, and neodecanoate. Glycidyl esters of commercially available mixtures of tertiary aliphatic carboxylic acids such as those available from Shell Chemical Company as VERSATIC ACID 911 are particularly preferred as the epoxy group and branched alkyl group containing compound. The glycidyl esters are commercially available from Shell Chemical Company as CARDURA E or GLYDEXX N-10 from Exxon Chemical Company.

The epoxy group and branched alkyl group containing compound is then reacted with carbon dioxide so as to produce a carbonate functional compound. A ring opening catalyst such as triphenyl phosphene or tertiary ammonium salt is normally employed. While the reaction will go under atmospheric pressure, positive pressures are usually used to reduce reaction time.

The resulting carbonate functional compound is subsequently reacted with ammonia or ammonium hydroxide to provide a the primary oarbamate functional reactive additive of the invention.

Alternatively, rather than produce a carbonate functional compound, the epoxy could be reacted with water to form alcohols, with subsequent conversion of the alcohols into carbamates via transesterification, urea decomposition and the like.

In a second method of the invention, glycol diols having the same structures of the epoxy functional compounds listed above can be used as a starting material. Such glycol diols must have at least one alkyl group selected from the group consisting of branched alkyl groups of from 5 to 30 total carbons, straight chain alkyl groups of more than 10 carbons, and mixtures thereof. Glycol diol as used herein refers to a diol wherein the two hydroxy groups are on adjacent carbons. Suitable glycol diols may contain other heteroatom groups as discussed above.

The glycol diols are reacted with phosgene or similar materials such as triphosgene. The resulting cyclic carbonate is then reacted as described above to form the primary carbamate functional reactive additive.

Finally, the glycol diols can be directly converted into primary carbamates using techniques such as reaction with urea, HNCO gas, or transesterification with carbamate ester such as methyl carbamate.

The compound (C) will generally have a molecular weight of 131–2000, and preferably from 131–1000 and most preferably from 131 to 500. The glass transition temperature, $T_g$, of components (A), (B), and (C) cap be adjusted to achieve a cured coating having the desired $T_g$ for the particular application involved. The compound (C) is preferably used at levels between 3 to 50 percent (based on total resin solids of the coating composition), and more preferably between 5 to 25 percent.

According to the present invention, at least one of components (A) and (B), or both components (A) and (B) must have at least one group thereon that is reactive with the carbamate group(s) on component (C). This is preferably accomplished through the selection of an aminoplast as component (B). Depending on the cure conditions, other compounds identified above as component (13) may also be reactive with the carbamate group(s) on component (C). Component (A) may also contain groups that are reactive with carbamate, such as an acrylic polymer containing isobutoxymethyl acrylamide groups.

A solvent may optionally be utilized in the coating composition used in the practice of the present invention. Although the composition used according to the present invention may be utilized, for example, in the form of substantially solid powder, or a dispersion, it is often desirable that the composition is in a substantially liquid state, which can be accomplished with the use of a solvent. This solvent should act as a solvent with respect to both the carbamate-functional compound (A) as well as the component (B). In general, depending on the solubility characteristics of components (A) and (B), the solvent can be any organic solvent and/or water. In one preferred embodiment, the solvent is a polar organic solvent. More preferably, the solvent is a polar aliphatic solvents or polar aromatic solvents. Still more preferably, the solvent is a ketone, ester, acetate, aprotic amide, aprotic sulfoxide, or aprotic amine. Examples of useful solvents include methyl ethyl ketone, methyl isobutyl ketone, m-amyl acetate, ethylene glycol butyl ether-acetate, propylene glycol monomethyl ether acetate, xylene, N-methylpyrrolidone, or blends of aromatic hydrocarbons. In another preferred embodiment, the solvent is water or a mixture of water with small amounts of co-solvents.

The coating composition used in the practice of the invention may include a catalyst to enhance the cure reaction. For example, when aminoplast compounds, especially monomeric melamines, are used as component (B), a strong acid catalyst may be utilized to enhance the cure reaction. Such catalysts are well known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

In a preferred embodiment of the invention, the solvent is present in the coating composition in an amount of from about 0.01 weight percent to about 99 weight percent, preferably from about 10 weight percent to about 60 weight percent, and more preferably from about 30 weight percent to about 50 weight percent.

Coating compositions can be coated on the article by any of a number of techniques well known in the art. These include, for example, spray coating, dip coating, roll coating, curtain coating, and the like. For automotive body panels, spray coating is preferred.

Any additional agent used, for example, surfactants, fillers, stabilizers, wetting agents, dispersing agents, adhesion promoters, UV absorbers, HALS, etc. may be incorporated into the coating composition. While the agents are well known in the prior art, the amount used must be controlled to avoid adversely affecting the coating characteristics.

The coating composition according to the invention is preferably utilized in a high-gloss coating and/or as the clearcoat of a composite color-plus-clear coating. High-gloss coatings as used herein are coatings having a 20° gloss (ASTM D523-89) or a DOI (ASTM E430-91) of at least 80.

When the coating composition of the invention is used as a high-gloss pigmented paint coating, the pigment may be any organic or inorganic compounds or colored materials, fillers, metallic or other inorganic flake materials such as mica or aluminum flake, and other materials of kind that the art normally names as pigments. Pigments are usually used in the composition in an amount of 1% to 100%, based on the total solid weight of components A, B and C (i.e., a P:B ratio of 0.1 to 1).

When the coating composition according to the invention is used as the clearcoat of a composite color-plus-clear coating, the pigmented basecoat composition may any of a number of types well known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are preferably crosslinkable and comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be thermoplastic, self-crosslinkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

The coating compositions described herein are preferably subjected to conditions so as to cure the coating layers. Although various methods of curing may be used, heat curing is preferred. Generally, heat curing is effected by exposing the coated article to elevated temperatures provided primarily by radiative heat sources. Curing temperatures will vary depending on the particular blocking groups used in the cross-linking agents, however they generally range between 93° C. and 177° C. The compounds (C) according to the present invention are reactive even at relatively low cure temperatures. Thus, in a preferred embodiment, the cure temperature is preferably between 115° C. and 150° C., and more preferably at temperatures between 115° C. and 138° C. for a blocked acid catalyzed system. For an unblocked acid catalyzed system, the cure temperature is preferably between 82° C. and 99° C. The curing time will vary depending on the particular components used, and physical parameters such as the thickness of the layers, however, typical curing times range from 15 to 60 minutes, and preferably 15–25 minutes for blocked acid catalyzed systems and 10–20 minutes for unblocked acid catalyzed systems.

The invention is further described in the following examples. All parts and percentages are by weight unless otherwise specified.

EXAMPLE 1

Preparation of a Preferred Reactive Additive (c).

Part (A)

Preparation of Cyclic Carbonate of the Glycidyl Ester of Neodecanoic Acid

A mixture of 16428 parts of Glydexx N-10 (glycidyl ester of neodecanoic acid, commercially available from Exxon Chemical Company) and 125.5 parts of tetrabutyl ammonium bromide was heated under $CO_2$ pressure (6.5 bars) to 120° C. The reaction mixture was held at 120° C. under pressure until the reaction was complete. The product mixture was then cooled and excess carbon dioxide removed.

Part (B1)

Preparation of the Beta Hydroxy Carbamate.

Ammonia gas was added to a mixture of 24290 parts of the product of Part (A) and 16192 parts of methanol. When the ring opening of the cyclic carbonate was complete, the methanol and excess ammonia was removed by vacuum.

Part (B2)

Alternative Preparation of the Beta Hydroxy Carbamate.

To a solution of 200 parts of concentrated ammonium hydroxide was slowly added 700 parts of the cyclic carbonate of Neodecanoic acid glycidyl ester (part A). Once the reaction was complete, the excess water and ammonium hydroxide was removed by vacuum distillation.

EXAMPLE 2

Preparation and Evaluation of Coating Compositions Prepared According to the Invention vs. Prior Art Compositions.

Part (A)

Preparation of a Carbamate Functional Resin.

A mixture of 278.1 parts of methyl isoamyl ketone, 1272.8 parts of VESTANAT® T 1890 A (a 70% solution of tie isocyanurate of IPDI in amyl acetate, commercially available from CreaNova) and 0.7 parts of dibutyl tin dilaurate were heated Under an inert atmosphere to 40° C. Then 463.5 of beta hydroxy butyl carbamate (the product from the reaction of ammonia with butylene carbonate) was slowly added. During this addition, the reaction temperature was allowed to go up to 80° C. After all of the beta hydroxy butyl carbamate was in, 115.9 parts of methyl isoamyl ketone was added. The reaction was then stirred at 80° C. for 2.5 hours then 148.3 pars of isobutanol, was added.

Part (B)

Preparation of Coating Compositions with and without the Reactive Additive (C) of the Invention.

Clearcoat coating compositions with (Coating A) and without (Coating B) the reactive additive (C) were prepared according to the following table.

| Component | Coating A | Coating B |
|---|---|---|
| Reactive additive - Ex 1B1 | 20.14 | 0.00 |
| Resin - Ex 2A | 77.43 | 131.31 |
| Crosslinking Agent[1] | 26.75 | 14.20 |
| UV Absorber[2] | 3.16 | 3.16 |
| HALS[3] | 1.50 | 1.50 |
| Flow Agent[4] | 0.80 | 0.00 |
| Flow Agent[5] | 0.00 | 0.17 |
| Catalyst[6] | 6.00 | 6.00 |
| Isobutyl Alcohol | 5.00 | 5.00 |
| EXXATE 1000[7] | 7.00 | 7.00 |
| MP Ketone[8] | 28.28 | 39.14 |

[1]Resimene ® 747, commercially available from Solutia of St Louis, MO.
[2]A UV absorber, commercially available from Ciba Geigy as Tinuvin ® 384B.
[3]A hindered amine light stabilizer, commercially available from Ciba Geigy as Tinuvin ® 123.
[4]A polysiloxane flow additive, commercially available from Byk Chemie as Byk 306.
[5]A polybutyl flow additive, commercially available from Lindeau Chemical as Lindron ™ 22.
[6]A blocked dodecylbenzenesulfonic acid
[7]Commercially available from Exxon Chemical Co.
[8]Methyl propyl ketone.

The viscosity of Coating A was 33 seconds on a #4 Ford cup @ 80° F. The theoretical and actual weight percent nonvolatile of Coating A was 57.00%. The viscosity of Coating B was 35 seconds on a #4 Ford cup @ 80° F. The theoretical weight percent nonvolatile of Coating B was 48.20%. The actual weight percent nonvolatile of Coating B was 50.86%.

Samples of both Coating A and Coating B were subjected to exterior horizontal Jacksonville 4, 10, and 14 week exposure testing at one of the automotive OEM etch evaluation sites in Jacksonville, Florida. Etch was rated on a scale of 1–100 with 1 being best and 100 being worst. An etch rating of from 1–3 indicates that etch is not noticeable to observation on a clear sunny day. An etch rating of from 4–6 indicates that etch is noticeable to a person trained at observing defect. 7–9 means that etch is noticeable to a nontrained person. 10+indicates extremely noticeable etch, Greater than 10 means that the system is a total failure with respect to etch testing.

Panels for etch testing were prepared by spraying a high solids solvent borne black basecoat over electrocoated steel panels. Coating A was sprayed wet on wet over said black basecoat and subjected to a 10 minute ambient flash and 20' at 270 degrees F metal temperature. Basecoat film build was approximately 0.7 mils and the clearcoat approximately 1.8 mils.

Jacksonville etch results for 4, 10 and 14 weeks respectively for Coating A were 2, 3 and 3. Jacksonville etch results for 4, 10 and 14 weeks respectively for Coating A were 2, 3 and 3.

Accordingly, it can be seen that significant improvements in the % nonvolatile were obtained without loss of performance with respect to environmental etch resistance.

EXAMPLE 3

Preparation and Evaluation of Coating Compositions Prepared According to the Invention vs. Prior Art Compositions Part (A)

Preparation of a Carbamate Functional Resin

A mixture of 218.8 parts of methyl isoamyl ketone, 492.4 parts of VESTANAT® T 1890 A (from CreaNova) and 0.3 parts of dibutyl tin dilaurate were heated under an inert atmosphere to 60° C. Then 400 parts of the beta hydroxy carbamate of the glycidyl ester of neodecanoic acid (formed from example 1B1) was added. Once all of the beta hydroxy carbamate was added the reaction mixture was heated to 90° C. and 53.4 parts of aromatic S-100 solvent was added. Once the reaction was complete 115.4 parts of isobutanol and 111.8 parts of amyl acetate was added.

Part (B)

Preparation of Coating Compositions with and without the Reactive Additive (C) of the Invention.

Clearcoat coating compositions with (Coating A) and without (Coating B) the reactive additive (C) were prepared according to the following table.

| Component | Coating A | Coating B |
|---|---|---|
| Reactive additive - Ex 1B1 | 20.98 | 0.00 |
| Resin - Ex 3A | 89.66 | 152.87 |
| Crosslinking Agent[9] | 23.96 | 10.43 |
| UV Absorber[10] | 3.16 | 3.16 |
| HALS[11] | 1.50 | 1.50 |
| Flow Agent[12] | 0.80 | 0.00 |
| Flow Agent[13] | 0.00 | 0.17 |
| DDBSA[14] | 6.00 | 6.00 |
| Isobutyl Alcohol | 5.00 | 5.00 |
| EXXATE 1000[15] | 7.00 | 7.00 |
| MP Ketone[16] | 5.87 | 6.92 |

[9]Resimene 747, commercially available from Solutia of St Louis, MO.
[10]A UV absorber, commercially available from Ciba Geigy.
[11]A hindered amine light stabilizer, commercially available from Ciba Geigy.
[12]A polysiloxane flow additive, commercially available from Byk Chemie.
[13]A polybutyl flow additive, commercially available from Lindeau Chemical.
[14]A blocked dodecylbenzenesulfonic acid
[15]Commercially available from Exxon Chemical Co.
[16]Methyl propyl ketone.

The viscosity of Coating A was 33 seconds on a #4 Ford cup @ 80° F. The theoretical weight percent nonvolatile of Coating A was 61.00%. The actual weight percent nonvolatile of Coating A was 58.38%. The viscosity of Coating B was 34 seconds on a #4Ford cup @ 80° F. The theoretical weight percent nonvolatile of Coating B was 51.80%. The actual weight percent nonvolatile of Coating B was 52.54%.

EXAMPLE 4

Preparation and Evaluation of Coating Compositions Prepared According to the Invention vs. Prior Art Compositions Part (A)

Preparation of a Carbamate Functional Resin

A mixture of 1973.0 parts of xylene, 1356.1 parts of methyl carbamate and 2032.0 parts of Glydexx N-10 (glycidyl ester of neodecanoic acid, commercially available from Exxon Chemical Company was charged to a flask and heated over an inert atmosphere to a 140 degrees C. Then a mixture of 1718.4 parts of hydroxyethyl methacrylate, 479.9 parts of styrene, 576.0 parts acrylic acid, 576.1 parts of Vazo® 67 (commercially available from Dupont Chemical Co. of Wilmington, DE) and 552.0 parts of xylene was added to the heated reaction mixture over three hours. The reaction mixture was then cooled to a 110 degrees C. A mixture of 23.9 parts Vazog® 67 and 200.0 parts of xylene was added to the cooled reaction mixture over a period of 65 minutes. The reaction mixture was then held at 110 degrees C. for an additional 60 minutes. The mixture was then cooled overnight and then heated to 140 degrees C. and held for six and a half-hours. After cooling the reaction mixture to room temperature, 28.3 parts of dibutyl tin oxide and 500 parts of toluene were added. The reaction was then heated to reflux and held for approximately seven and a half-hours. Solvent and excess reagents were then removed by vacuum stripping. 2186 parts of Proposolv PM alcohol was added then added. The experimental % nonvolatile of the clear dark yellow resin was 69.59.

Part (B)

Preparation of Coating Compositions with and without the Reactive Additive (C) of the Invention Clearcoat coating compositions with (Coating A) and without (Coating B) the reactive additive (C) were prepared according to the following table.

| Component | Coating A | Coating B |
|---|---|---|
| Reactive additive - Ex 1B1 | 36.49 | 0.00 |
| Resin - Ex 3A | 52.44 | 107.78 |
| Crosslinking Agent[17] | 34.36 | 31.08 |
| UV Absorber[18] | 1.00 | 1.00 |
| UV Absorber[19] | 15.71 | 15.71 |
| HALS[20] | 6.00 | 6.00 |
| Flow Agent[21] | 1.00 | 1.00 |
| Catalyst[22] | 4.80 | 4.80 |
| Glycol Ether | 23.63 | 35.46 |

[17]Resimene BM5739, commercially available from Solutia of St Louis, MO.
[18]A UV absorber, commercially available from Ciba Geigy.
[19]A UV absorber, commercially available from Ciba Geigy, used at 3% solids on fixed vehicle solids.
[20]A hindered amine light stabilizer, commercially available from Ciba Geigy.
[21]A polyacrylate flow additive commercially available from Lindeau Chemical.
[22]Blocked dodecylbenzenesulfonic acid The viscosity of Coating A was 35 seconds on a #4 Ford cup @ 80° F. The theoretical weight percent nonvolatile of Coating A was 57.00%. The viscosity of Coating B was 35 seconds on a #4 Ford cup @ 80° F. The theoretical weight percent nonvolatile of Coating B was 49.30%.

Various film properties such as low bake and overbake repair adhesion, humidity whitening, Tukon microhardness and pop were tested as follows:

Low Bake and Overbake Repair Adhesion

Two different basecoats as described below were individually coated onto electrocoated steel panels as the basecoat of a basecoat/clearcoat composite at a thickness of approximately 1.0 mil for the red basecoat and 0.8 for the beige basecoat. The clearcoats of Coatings A and B as described above were subsequently applied at varying thicknesses of from 0 to 2.0 mils in a wedge pattern. The panels were subsequently cured wet on wet at a metal temperature of 260 degrees F for 15 minutes for the low bake repair test. Panels for the overbake repair test were cured wet on wet at a metal temperature of 300 degrees F for 90 minutes. For both tests, a second basecoat layer, identical to the basecoat layer of the cured first composite layer on the panel and at the same basecoat film build used in the first composite layer, was applied over the cured first composite layer, followed by a second identical clearcoat layer of 2.0 mil. This second basecoat/clearcoat composite was cured at 260 degrees for 15 minutes for both the low bake and overbake repair tests.

The panels were then subjected to an adhesion test as described in ASTM 3359, hereby incorporated by reference, involving scribing a portion of the coating with a crosscut pattern and applying and removing pressure-sensitive adhesive tape. The panels were evaluated for percent adhesion remaining over the length of the clearcoat wedge. 100% adhesion indicated that no basecoat/clearcoat was removed during the test. Any panel with less than 90% adhesion was deemed a failure.

Humidity Whitening

Panels were prepared by coating two different types of black basecoat onto electrocoated steel panels at a film build of approximately 0.7 mil. The above clearcoats were applied directly to the wet basecoat at a film build of approximately 1.5–2.0 mil. The coatings were cured wet on wet with a 10-minute flash at ambient temperature followed by 20 minutes at 275 degrees F.

Panels were evaluated for whitening after 24 hours at 140 degrees F in a commercially available QCT apparatus. Whitening was ranked on a scale of from 1 to 10, with 1 being the best and 10 being the worst.

Tukon Microhardness

Panels were prepared as indicated above for the Humidity Whitening test, except that a BASF Corporation black experimental waterborne high solids emulsion based basecoat was used.

Microhardness was evaluated per ASTM D1474. A ranking of from 0 to 40 was assigned, with 40 being the hardest and 0 being the softest. A ranking of from 0 to 20 is considered acceptable. A ranking of from 8 to 10 Knoops is considered ideal.

Solvent Pop

Panels were generally prepared per General Motors Test Method 9690P for popping. The clearcoats of Coatings A and B were applied to steel panels in varying film builds via an automated spray machine. After a timed flash of approximately 2 minutes, all panels were baked at 20 minutes at 275 degrees F.

The minimum film build at which solvent popping was observed was recorded. In general, the higher the film build at which popping is observed, the better.

The results of the evaluations are as follows:

| | Repair Adhesion (% Remaining) | | | |
|---|---|---|---|---|
| | H/S waterborne red BC[23] | | M/S solventborne beige BC[24] | |
| Sample | Low bake | Overbake | Low bake | Overbake |
| Coating A | 100 | 100 | 100 | 100 |
| Coating B | 100 | 100 | 100 | 100 |

| | Humidity Whitening | |
|---|---|---|
| Samples | H/S waterborne black BC[25] | M/S solvtbrne black BC[26] |
| Coating A | 4 | 2 |
| Coating B | 4 | 2 |

| Tukon Microhardness (Knoops) | |
|---|---|
| Coating A | 10.1 |
| Coating B | 16.5 |

| Solvent Popping | |
|---|---|
| Coating A | 3.0 |
| Coating B | 1.2 |

[23]A red high solids waterborne PUR acrylic based basecoat, commercially available from BASF Corporation of BASF Corporation as _____.
[24]A beige medium solids solventborne hydroxyl functional acrylic/aminoplast based basecoat, commercially available from BASF Corporation of Southfield MI as _____.
[25]A black high solids waterborne PUR acrylic based basecoat, commercially available from BASF Corporation of BASF Corporation as _____.
[26]A black medium solids solventborne hydroxyl functional acrylic/aminoplast based basecoat, commercially available from BASF Corporation of Southfield MI as _____.

Based on all of the above data, it can be seen that advantages in microhardness and POP have been achieved with the use of the reactive additive (C), without loss of any other desirable properties.

We claim:

1. A curable coating composition comprising
   (A) a polymer resin comprising at least one primary carbamate group,
   (B) a curing agent having groups that are reactive with polymer resin (A), and
   (C) a reactive additive comprising at least one compound having a molecular weight of from 131 to 2000 and comprising at least one β-hydroxy primary carbamate group and at least one alkyl group selected from the group consisting of branched alkyl groups of from 5 to 30 carbons, straight chain alkyl groups of more than 10 carbons, and mixtures thereof, wherein one or both of (A) and (B) comprise groups that are reactive with the primary carbamate group of (C).

2. The composition of claim 1 wherein component (A) has a number average molecular weight of from more than 2000 to 20000.

3. The curable coating composition of claim 1 wherein the reactive additive (C) has only one carbamate group.

4. The curable coating composition of claim 1 wherein the at least one alkyl group is a branched alkyl group of from 8 to 12 carbons.

5. The curable coating composition of claim 4 wherein the at least one alkyl group is a branched alkyl group of at least 10 carbons.

6. A curable coating composition comprising
   (A) a polymer resin comprising at least one primary carbamate group,
   (B) a curing agent having groups that are reactive with polymer resin (A), and
   (C) a reactive additive comprising at least one compound having a molecular weight of from 233 to 2000 and leaving the formula:

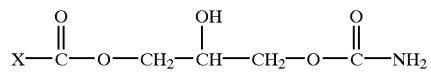

wherein X is a branched alkyl group of from 5 to 30 carbons, and one or both of (A) and (B) comprise groups that are reactive with the primary carbamate group of (C).

7. The curable coating composition of claim 6 wherein the reactive additive (C) has only one carbamate group.

8. The curable coating composition of claim 6 wherein X is

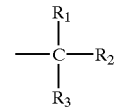

wherein one of $R_1$, $R_2$, and $R_3$ is hydrogen and each of the remaining $R_1$, $R_2$, and $R_3$ are an alkyl group of from 1 to 10 carbons.

9. The curable coating composition of claim 6 wherein at least one of $R_1$, $R_2$, and $R_3$ is a methyl group and each of the remaining $R_1$, $R_2$, and $R_3$ are an alkyl group of from 8 to 12 carbons.

* * * * *